US010462676B2

(12) United States Patent
Mallik et al.

(10) Patent No.: US 10,462,676 B2
(45) Date of Patent: Oct. 29, 2019

(54) INTER-OPERATOR SRS RESOURCE COORDINATION IN SDM-COMP

(71) Applicant: QUALCOMM Incorporated, San Diego, CA (US)

(72) Inventors: Siddhartha Mallik, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 15/707,824

(22) Filed: Sep. 18, 2017

(65) Prior Publication Data

US 2018/0295523 A1 Oct. 11, 2018

Related U.S. Application Data

(60) Provisional application No. 62/483,810, filed on Apr. 10, 2017.

(51) Int. Cl.
*H04W 16/14* (2009.01)
*H04L 5/00* (2006.01)
(Continued)

(52) U.S. Cl.
CPC ............ *H04W 16/14* (2013.01); *H04B 7/024* (2013.01); *H04B 7/0417* (2013.01); *H04B 17/318* (2015.01); *H04L 5/003* (2013.01); *H04L 5/0035* (2013.01); *H04L 5/0051* (2013.01); *H04L 5/0064* (2013.01); *H04W 16/32* (2013.01); *H04W 72/042* (2013.01);
(Continued)

(58) Field of Classification Search
CPC ... H04W 16/14; H04W 16/32; H04W 72/042; H04W 72/0446; H04W 74/08; H04B 7/024; H04B 7/0417; H04B 17/318; H04L 5/003; H04L 5/0035; H04L 5/0051; H04L 5/0064; H04L 5/0037
USPC .......................................................... 370/329
See application file for complete search history.

(56) References Cited

U.S. PATENT DOCUMENTS 9,609,643 B2 * 3/2017 Zhang .................... H04W 68/00
9,787,451 B2 * 10/2017 Seo .......................... H04L 5/001
(Continued)

FOREIGN PATENT DOCUMENTS

WO    WO-2011083746 A1    7/2011

OTHER PUBLICATIONS

International Search Report and Written Opinion—PCT/US2018/021806—ISA/EPO—dated Aug. 18, 2018.

*Primary Examiner* — William Nealon
(74) *Attorney, Agent, or Firm* — Norton Rose Fulbright LLP

(57) ABSTRACT

Inter-operator sounding reference signal (SRS) resource coordination is discussed in spatial divisional multiplex (SDM) coordinated multipoint (CoMP) operations. The higher priority operator conveys SRS resource reservation information identifying the fraction of resources it intends to use. The lower priority operator observes this resource reservation information and selects to reserve SRS resources from the remaining fraction of resources, if any, for scheduling its own users' SRS. The lower priority operator will transmit its own resource reservation information identifying the amount of SRS resources that it has identified for the non-priority use.

26 Claims, 10 Drawing Sheets

(51) Int. Cl.
  *H04B 7/024*    (2017.01)
  *H04B 7/0417*   (2017.01)
  *H04W 72/04*    (2009.01)
  *H04W 74/08*    (2009.01)
  *H04B 17/318*   (2015.01)
  *H04W 16/32*    (2009.01)

(52) U.S. Cl.
  CPC ....... *H04W 72/0446* (2013.01); *H04W 74/08* (2013.01); *H04L 5/0037* (2013.01)

(56) References Cited

U.S. PATENT DOCUMENTS

| | | | | |
|---|---|---|---|---|
| 2012/0281654 | A1* | 11/2012 | Aiba | H04L 5/0007 370/329 |
| 2015/0092758 | A1* | 4/2015 | Chen | H04W 16/14 370/336 |
| 2017/0048054 | A1* | 2/2017 | Tsuda | H04W 16/32 |
| 2018/0027580 | A1 | 1/2018 | Yoo et al. | |

* cited by examiner

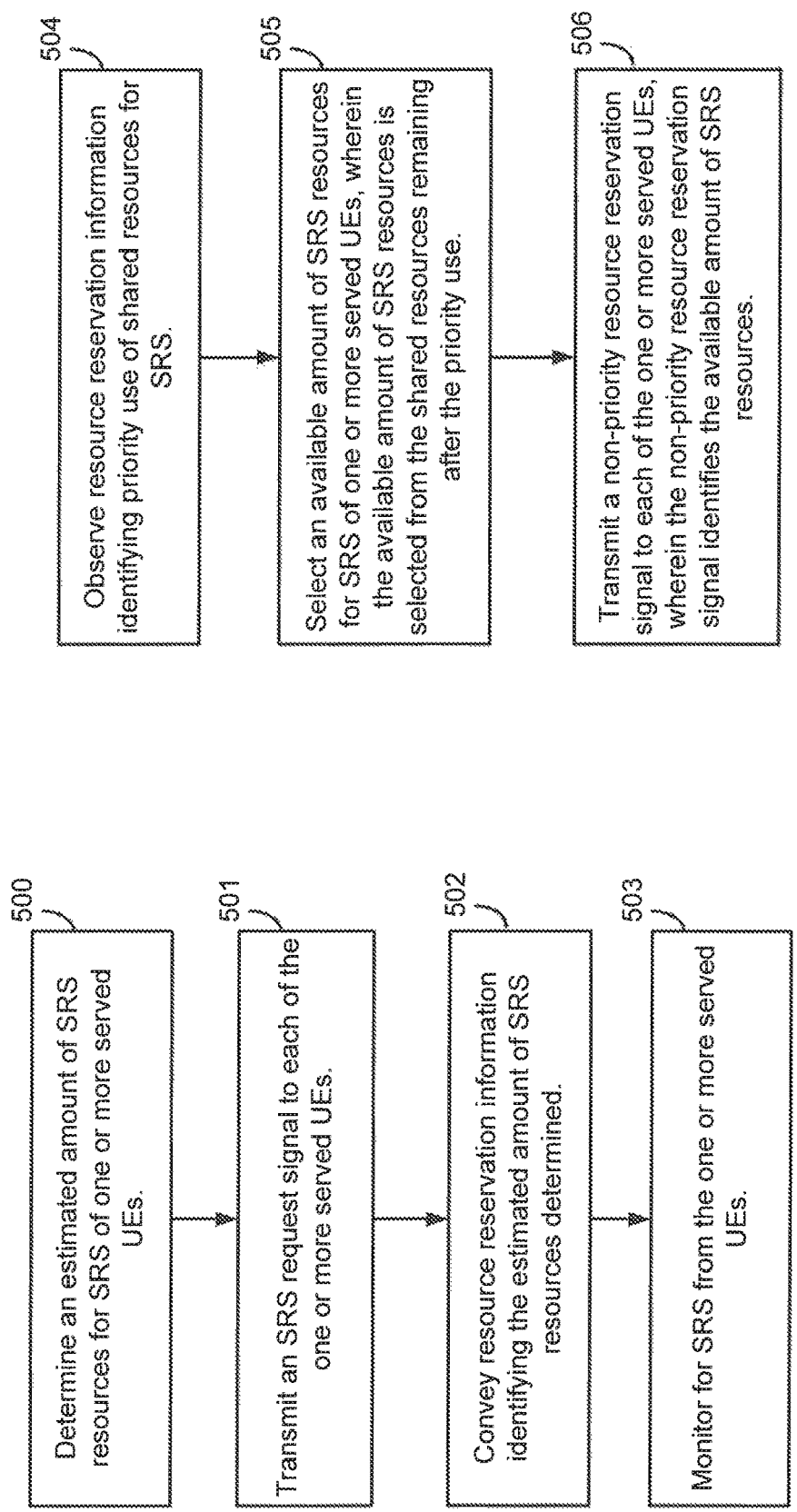

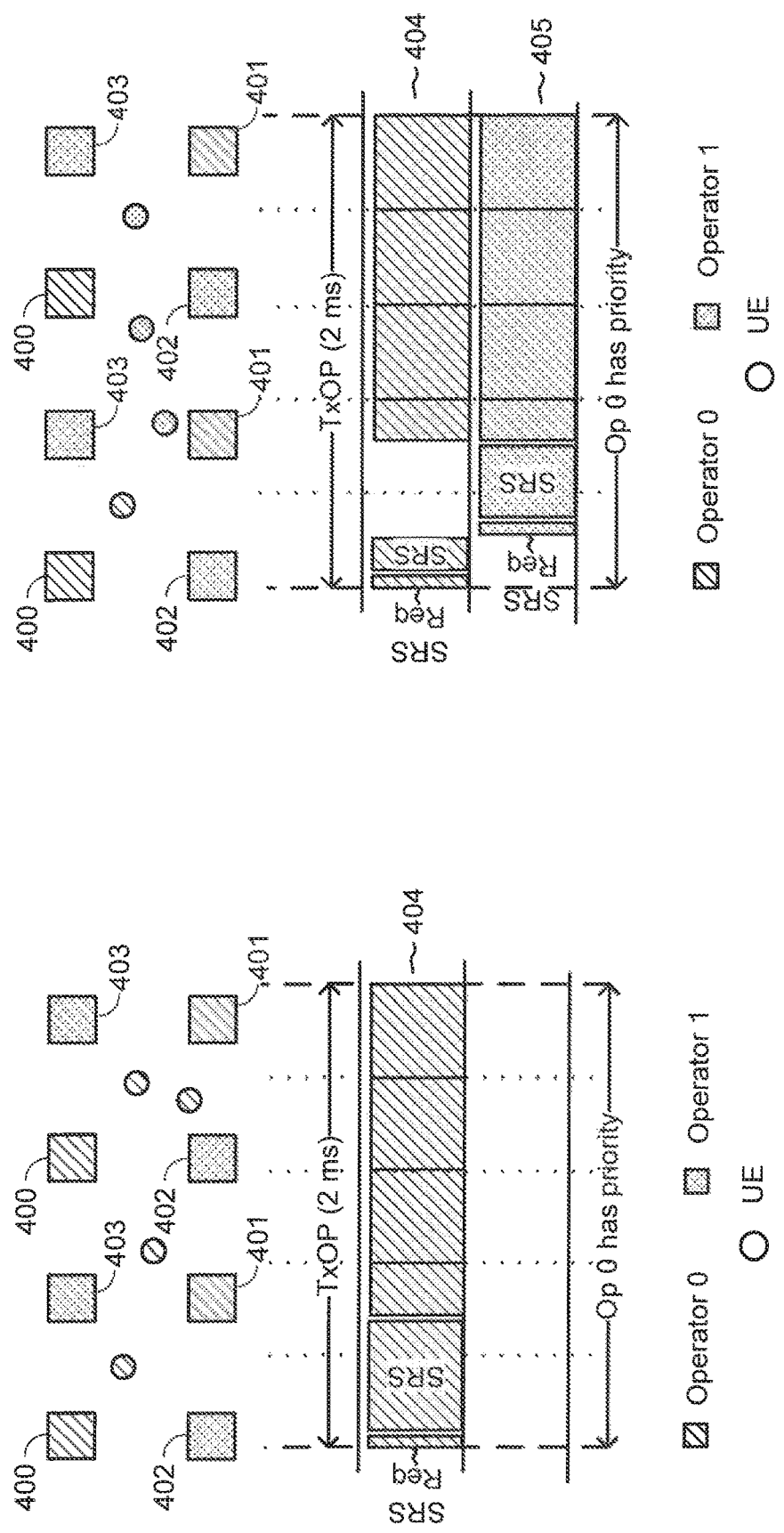

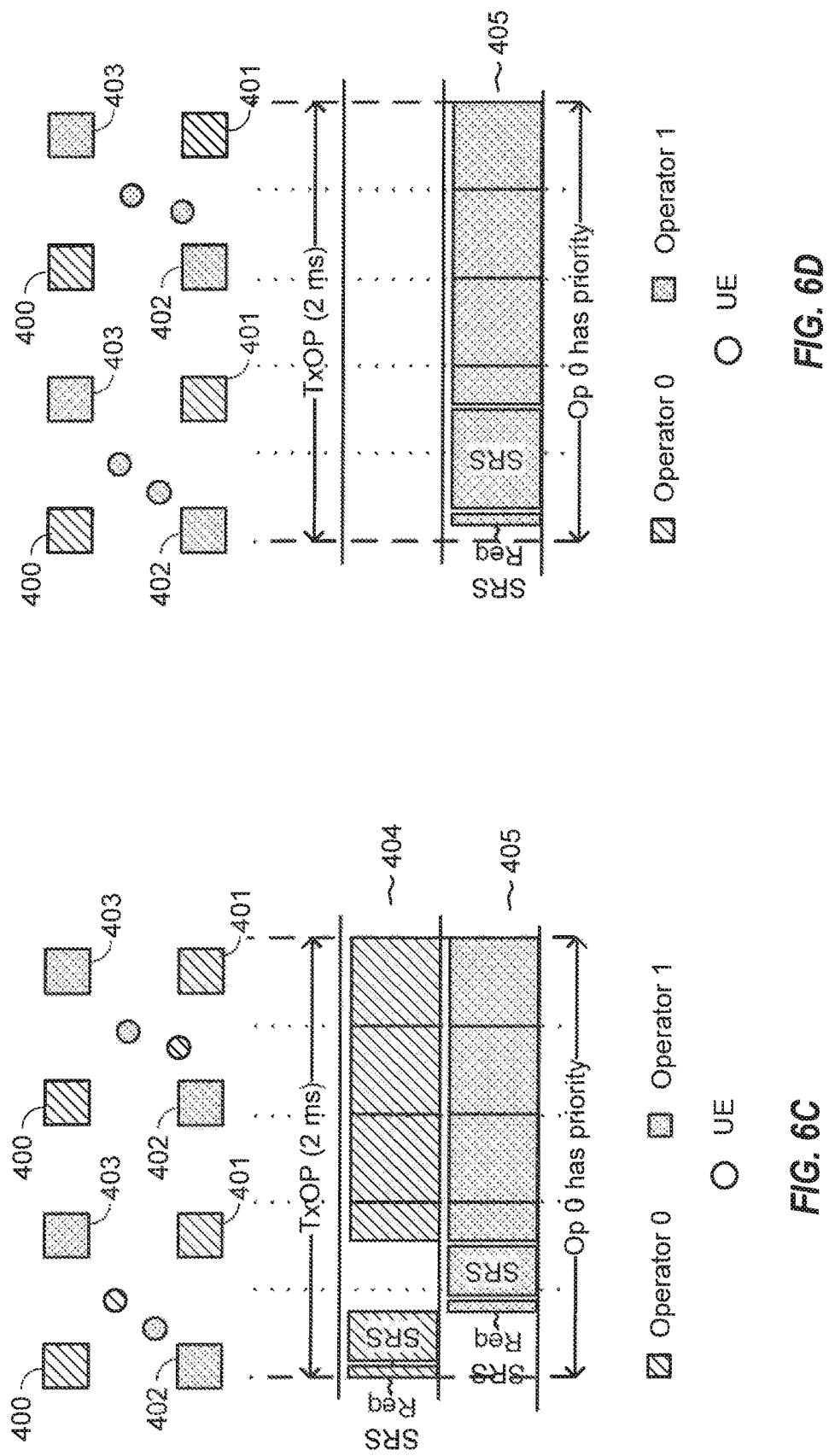

INTER-OPERATOR SRS RESOURCE COORDINATION IN SDM-COMP

CROSS-REFERENCE TO RELATED APPLICATIONS

This application claims the benefit of U.S. Provisional Patent Application No. 62/483,810, entitled, "INTER-OPERATOR SRS RESOURCE COORDINATION IN SDM-COMP," filed on Apr. 10, 2017, which is expressly incorporated by reference herein in its entirety.

BACKGROUND

Field

Aspects of the present disclosure relate generally to wireless communication systems, and more particularly, to inter-operator sounding reference signal (SRS) resource coordination in spatial divisional multiplex (SDM) coordinated multipoint (CoMP) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, at a priority base station associated with a first network operator, an estimated amount of sounding reference signal (SRS) resources for SRS of one or more served user equipments (UEs), wherein the priority base station uses shared communication spectrum shared with one or more non-priority base stations associated with at least one different network operator, transmitting, by the priority base station, an SRS request signal to each of the one or more served UEs, conveying, by the priority base station, resource reservation information identifying the estimated amount of SRS resources determined and monitoring, by the priority base station, for SRS from the one or more served UEs.

In an additional aspect of the disclosure, a method of wireless communication includes observing, by a non-priority base station associated with a first network operator, resource reservation information identifying priority use of shared resources for SRS, wherein the non-priority base station uses shared communication spectrum shared with one or more priority base stations associated with at least one different network operator, wherein the one or more priority base stations have priority access to the shared communication spectrum over the non-priority base station, selecting, by the non-priority base station, an available amount of SRS resources for SRS of one or more served UEs, wherein the available amount of SRS resources is selected from the shared resources for SRS remaining after the priority use, and transmitting, by the non-priority base station, a non-priority resource reservation signal to each of the one or more served UEs, wherein the non-priority resource reservation signal identifies the available amount of SRS resources.

In an additional aspect of the disclosure, an apparatus configured for wireless communication includes means for determining, at a priority base station associated with a first network operator, an estimated amount of SRS resources for SRS of one or more served UEs, wherein the priority base station uses shared communication spectrum shared with one or more non-priority base stations associated with at least one different network operator, means for transmitting, by the priority base station, an SRS request signal to each of the one or more served UEs, means for conveying, by the priority base station, resource reservation information identifying the estimated amount of SRS resources determined and means for monitoring, by the priority base station, for SRS from the one or more served UEs.

In an additional aspect of the disclosure, an apparatus configured for wireless communication includes means for observing, by a non-priority base station associated with a first network operator, resource reservation information identifying priority use of shared resources for SRS, wherein the non-priority base station uses shared communication spectrum shared with one or more priority base stations associated with at least one different network operator, wherein the one or more priority base stations have priority access to the shared communication spectrum over the non-priority base station, means for selecting, by the non-priority base station, an available amount of SRS resources for SRS of one or more served UEs, wherein the available amount of SRS resources is selected from the shared resources for SRS remaining after the priority use, and means for transmitting, by the non-priority base station, a non-priority resource reservation signal to each of the one or more served UEs, wherein the non-priority resource reservation signal identifies the available amount of SRS resources.

In an additional aspect of the disclosure, a non-transitory computer-readable medium having program code recorded thereon. The program code further includes code to determine, at a priority base station associated with a first network operator, an estimated amount of SRS resources for SRS of one or more served UEs, wherein the priority base station uses shared communication spectrum shared with one or more non-priority base stations associated with at least one different network operator, code to transmit, by the priority base station, an SRS request signal to each of the one or more served UEs, code to convey, by the priority base station, resource reservation information identifying the estimated amount of SRS resources determined and code to monitor, by the priority base station, for SRS from the one or more served UEs.

In an additional aspect of the disclosure, a non-transitory computer-readable medium having program code recorded thereon. The program code further includes code to observe, by a non-priority base station associated with a first network operator, resource reservation information identifying priority use of shared resources for SRS, wherein the non-priority base station uses shared communication spectrum shared with one or more priority base stations associated with at least one different network operator, wherein the one or more priority base stations have priority access to the shared communication spectrum over the non-priority base station, code to select, by the non-priority base station, an available amount of SRS resources for SRS of one or more served UEs, wherein the available amount of SRS resources is selected from the shared resources for SRS remaining after the priority use, and code to transmit, by the non-priority base station, a non-priority resource reservation signal to each of the one or more served UEs, wherein the non-priority resource reservation signal identifies the available amount of SRS resources.

In an additional aspect of the disclosure, an apparatus configured for wireless communication is disclosed. The apparatus includes at least one processor, and a memory coupled to the processor. The processor is configured to determine, at a priority base station associated with a first network operator, an estimated amount of SRS resources for SRS of one or more served UEs, wherein the priority base station uses shared communication spectrum shared with one or more non-priority base stations associated with at least one different network operator, to transmit, by the priority base station, an SRS request signal to each of the one or more served UEs, to convey, by the priority base station, resource reservation information identifying the estimated amount of SRS resources determined and to monitor, by the priority base station, for SRS from the one or more served UEs.

In an additional aspect of the disclosure, an apparatus configured for wireless communication is disclosed. The apparatus includes at least one processor, and a memory coupled to the processor. The processor is configured to observe, by a non-priority base station associated with a first network operator, resource reservation information identifying priority use of shared resources for SRS, wherein the non-priority base station uses shared communication spectrum shared with one or more priority base stations associated with at least one different network operator, wherein the one or more priority base stations have priority access to the shared communication spectrum over the non-priority base station, to select, by the non-priority base station, an available amount of SRS resources for SRS of one or more served UEs, wherein the available amount of SRS resources is selected from the shared resources for SRS remaining after the priority use, and to transmit, by the non-priority base station, a non-priority resource reservation signal to each of the one or more served UEs, wherein the non-priority resource reservation signal identifies the available amount of SRS resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A and 5B are block diagrams illustrating example blocks executed to implement aspects of the present disclosure.

FIGS. 6A-6D are block diagrams illustrating dynamic resource allocation of SRS between base stations from two different operators according to one aspect of the present disclosure.

DETAILED DESCRIPTION

Figure 1:
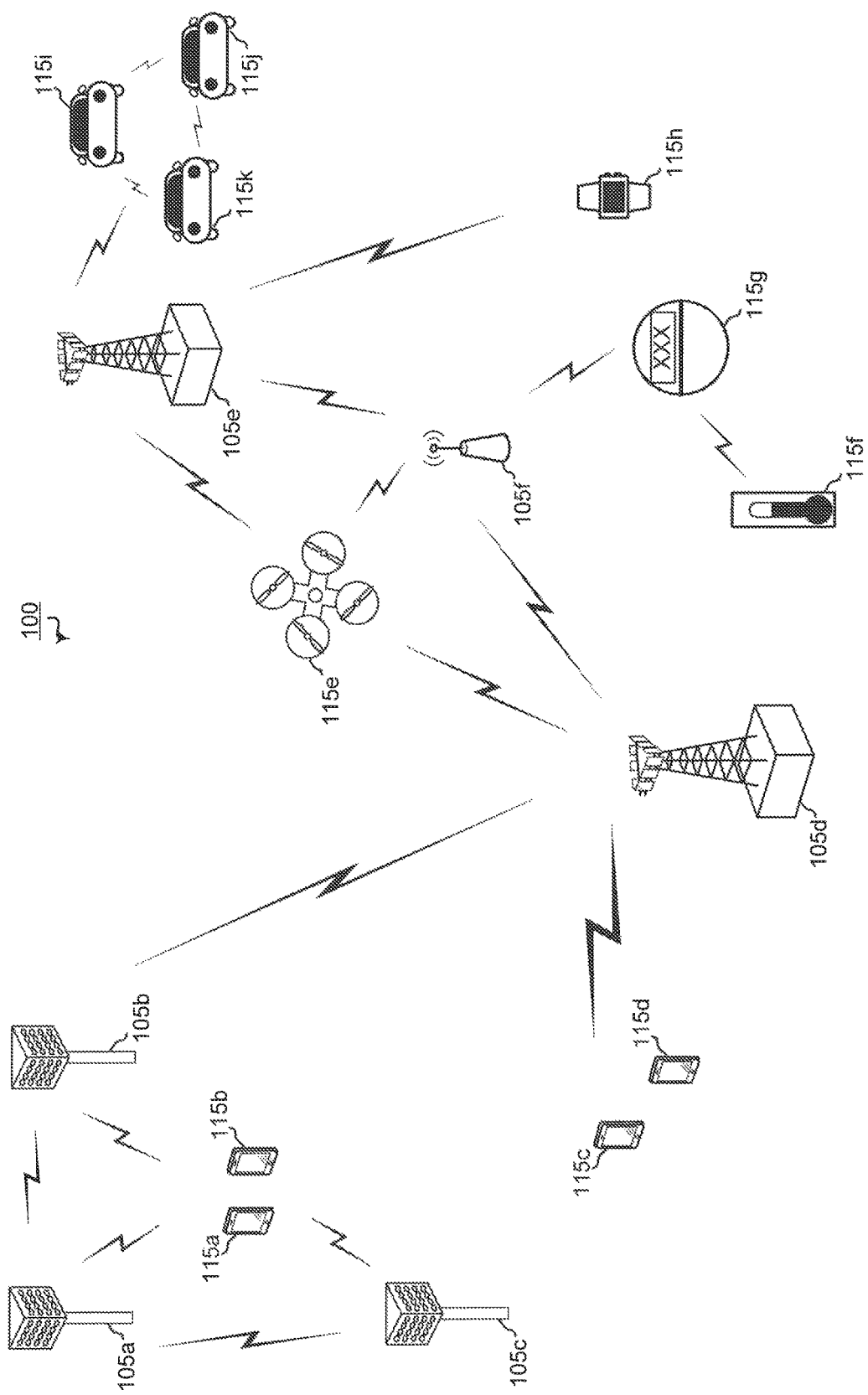
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LIE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
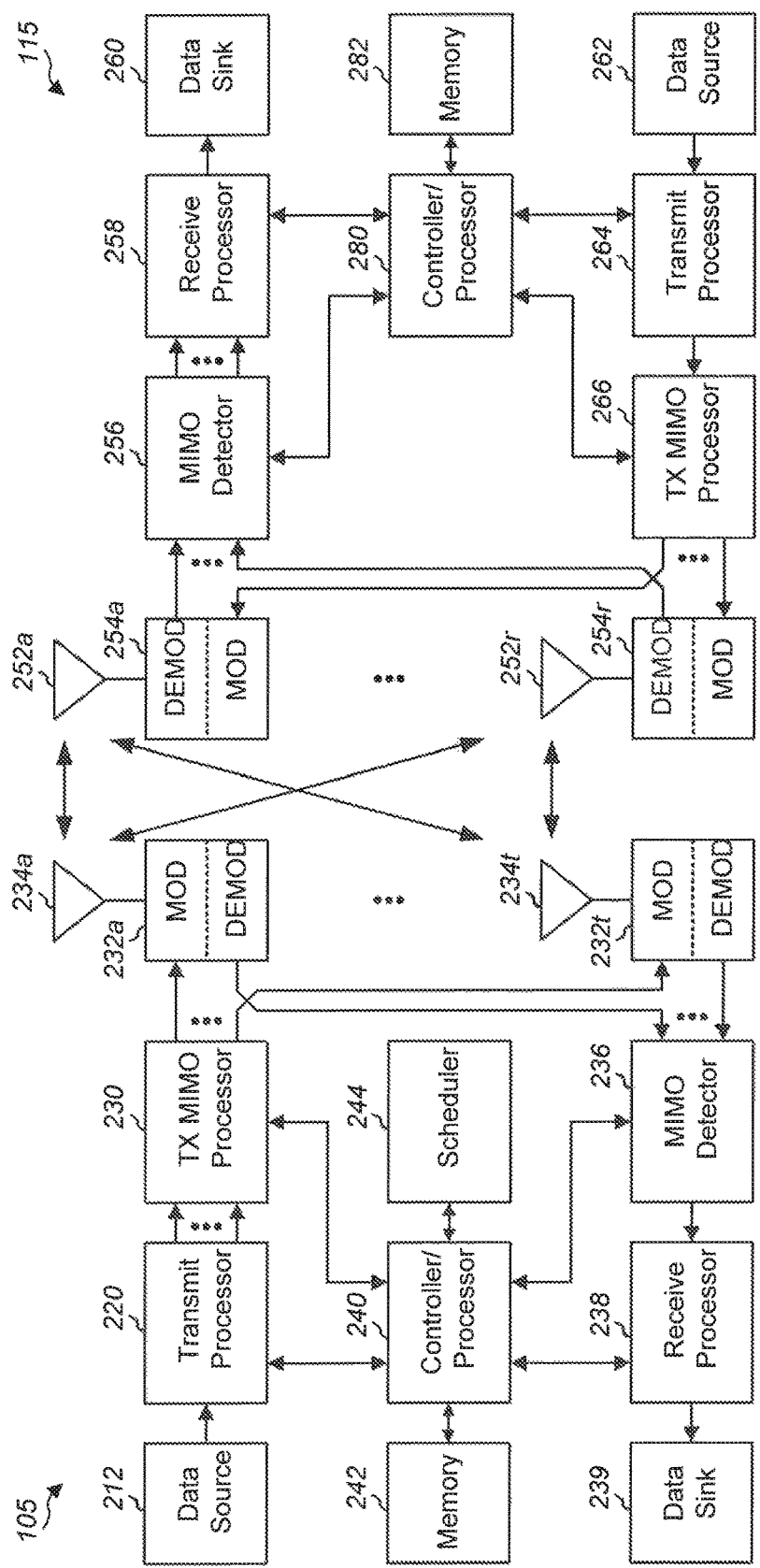
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252*a* through 252*r* may receive the downlink signals from the base station 105 and may provide received signals to the demodulators (DE-MODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A and 5B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
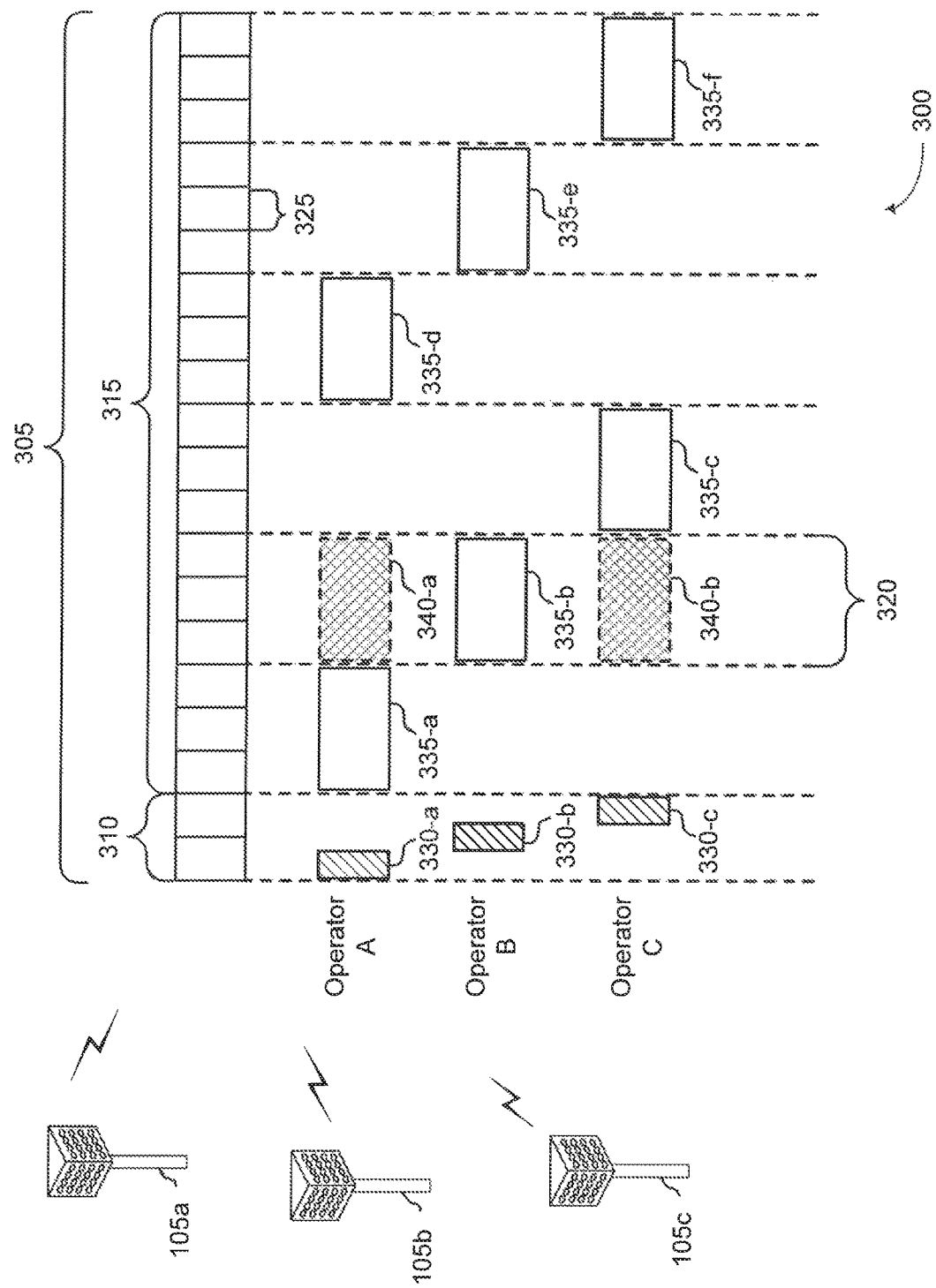
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305.

This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Multiple different network operators may operate wireless networks using the same set of wireless spectrum. The network nodes of the different operators may share the spectrum using any variety of methods including both contention-based and non-contention-based access mechanisms. In some operations, one or more network operators may have priority to access the spectrum over the others. Various priority schemes may also be used, such that the same network operator may not always have priority access to the shared spectrum. The different network operates may rotate priority access status. Still other operations may provide for multiple levels of priority, such that one operator may have first priority over, for example, two other operators operating communications in the same area, while one of the two lower-priority operators may have priority over the second lower-priority operator.

One consideration for implementations in which multiple different operators are operating wireless networks sharing the same spectrum is the coordination of sounding reference signal (SRS) resources between the multiple operators using space division multiplexing (SDM) coordinated multipoint (SDM-CoMP) functionality. SDM-CoMP is a CoMP technique that generally works more efficiently than time division multiplexing (TDM)-CoMP at low to medium loads. SDM-CoMP relies on an one operator listening to the uplink SRS transmissions from the scheduled UEs of the second operator, and computing beams/precoders to serve its own UEs so as to avoid causing interference to the scheduled UEs of the second operator. The baseline approach for SRS resource coordination in SDM is static resource allocation, where each operator utilizes a fixed percentage of available resources for data and SRS transmission. For example, where four access points are identified per operator in a two-operator shared spectrum region, each operator may schedule two users each. In a TDM implementation of the same two-operator shared spectrum region, only one operator will be active at any given time and that active operator would be able to schedule four users.

Figure 4:
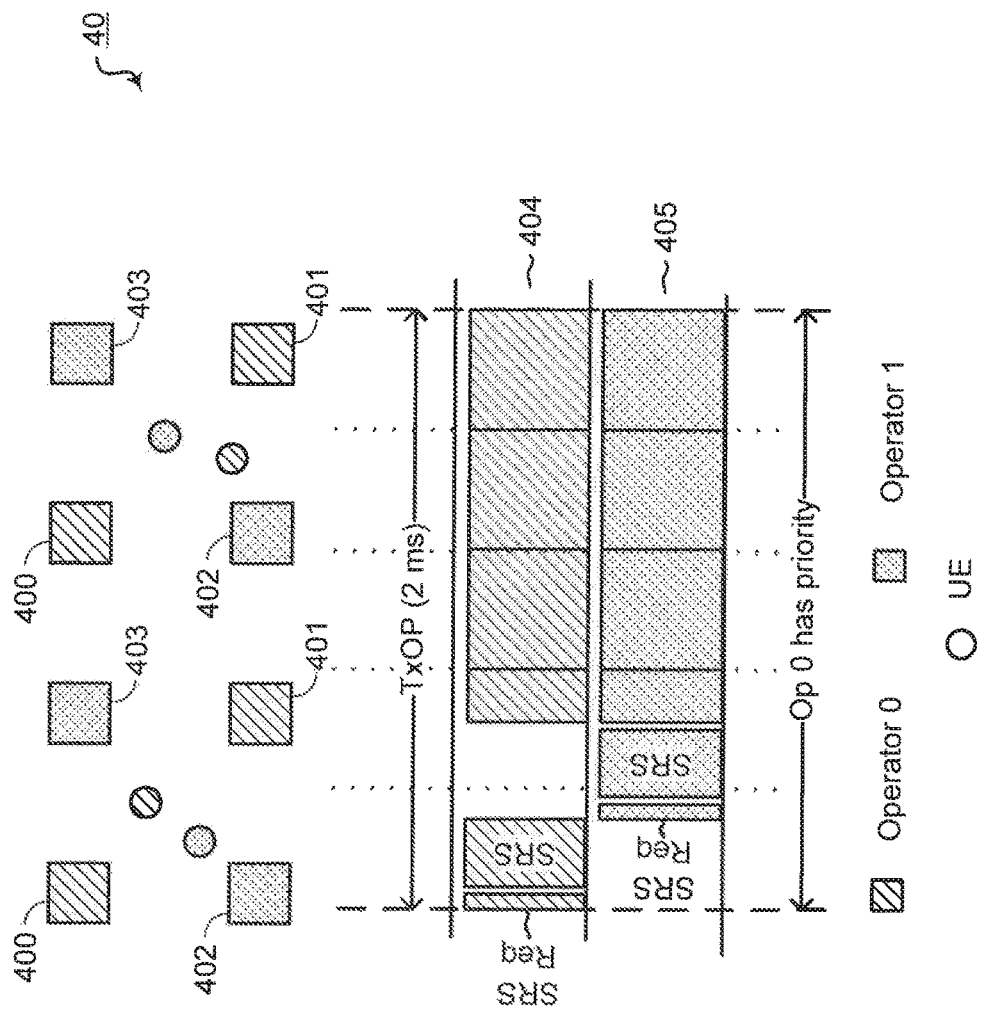
FIG. 4 is a block diagram illustrating a shared spectrum network with base stations operated by different network operators.

FIG. 4 is a block diagram illustrating shared spectrum network 40 with base stations 400-403 operated by different network operators. Base stations 400-401 are operated by Operator 0, which has priority access to shared spectrum network 40, while base stations 402-403 are operated by Operator 1. For SDM-CoMP operations, base stations 402-403, as the lower-priority operator, listen for the SRS from the UEs served by Operator 0, base stations 400-401. Once SRS are detected, base stations 402-403 may perform beamforming and provide precoders to reduce the interference based on SRS for its own UEs. In transmission stream 404, base stations 400-401 of Operator 0 transmit SRS requests to the served UEs of Operator 0 and then receive SRS from those UEs. Similarly, in transmission stream 405, base stations 402-403 of operator 1 transmit SRS requests to their served UEs of Operator 1 using the beamformed/precoded transmissions.

Various aspects of the present disclosure provide for the higher priority operator to indicate, via the preamble transmission that carriers the SRS request, the fraction of resources it intends to use. The lower priority operator will observe or read this resource reservation information then use the remaining fraction of resources, if any, for scheduling its own UEs' SRS.

Figure 9:
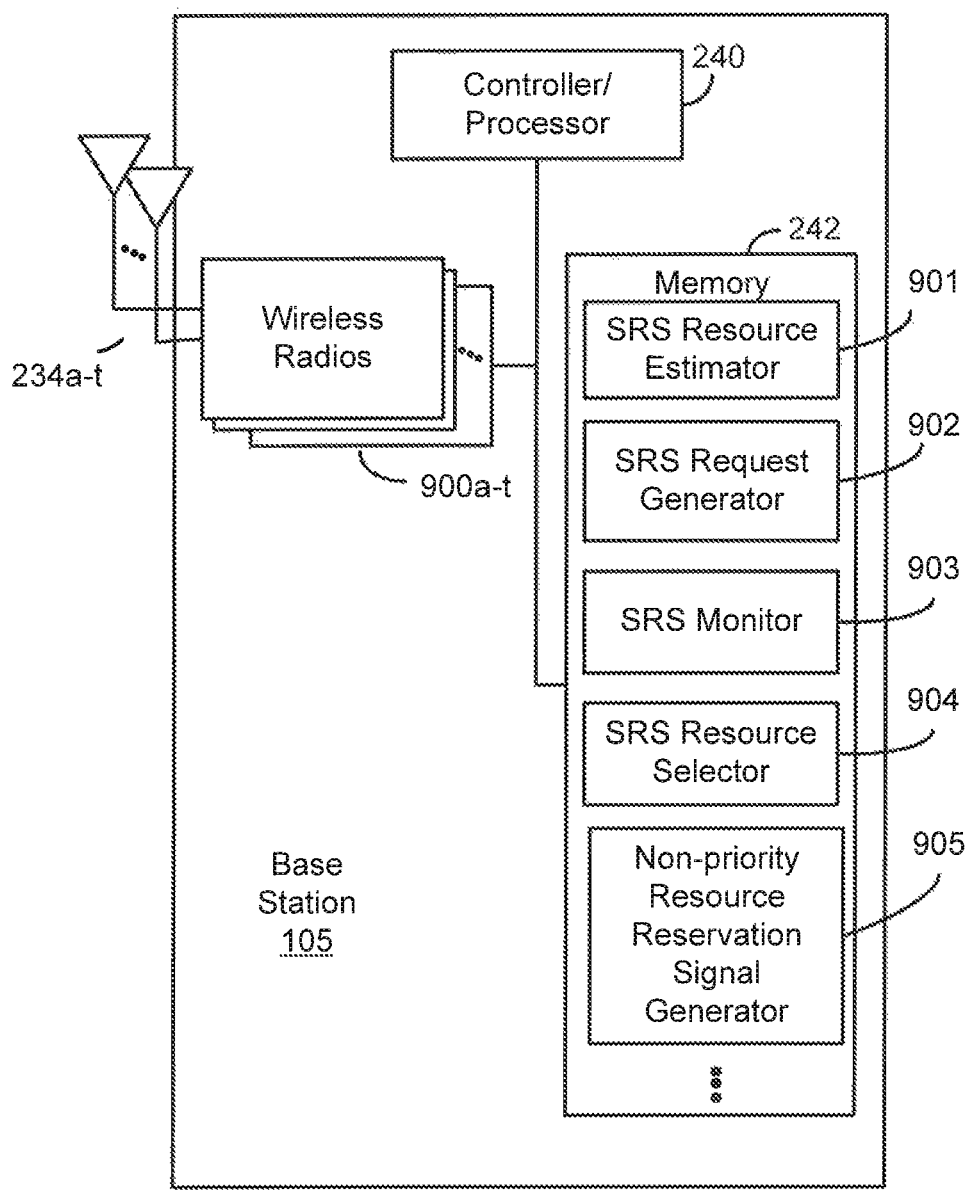
FIG. 9 is a block diagram illustrating an example base station configured according to aspects of the present disclosure.

FIG. 5A is a block diagram illustrating example blocks executed by a priority operator to implement one aspect of the present disclosure. The example blocks illustrated in FIG. 5A will also be described with respect to base station 105, as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-t and antennas 234a-t. Wireless radios 900a-t includes various components and hardware, as illustrated in FIG. 2 for base station 105, including modulator/demodulators 232a-t, MIMO detector 236, receive processor 238, transmit processor 220, and TX MIMO processor 230.

At block 500, a priority operator base station determines an estimate of the amount of SRS resources for SRS of one or more served UEs. For example, base station 105, under control of controller/processor 240, activates SRS resource estimator 901, stored in memory 242. The execution environment of SRS resource estimator 901 allows base station 105 to determine an estimate of the amount of SRS resources for SRS of one or more served UEs. The priority operator base station identifies the UEs that it serves and can determine an estimated amount of the available SRS resources that will be needed for SRS transmissions.

At block 501, the priority operator base station transmits an SRS request signal to each of the one or more served UEs. For example, base station 105, under control of controller/processor 240, may activate SRS request generator 902, stored in memory 242. The execution environment of SRS request generator 902 allows base station 105 to generate a SRS request signal, and to transmit the SRS request signal to each of the one or more served UEs via wireless radios 900a-t and antennas 234a-t. In order to elicit the SRS from its served UEs, the priority operator, through the priority operator base stations, will transmit an SRS request signal that may prompt its served UEs to transmit SRS.

At block 502, the priority operator base station conveys resource reservation information identifying the estimated amount of SRS resources that were determined for use. For example, the execution environment of base station 105, under control of controller/processor 240, allows base station 105 to convey resource reservation information identifying the estimated amount of SRS resources that were determined for use. The information regarding the estimated amount of SRS resources reserved may be explicitly transmitted, for example, through a resource reservation signal transmitted either with the SRS request or directly to the other operators via over-the-air, e.g., using wireless radios 900a-t and antennas 234a-t, or backhaul signaling. The resource reservation information may also be implicitly conveyed, through detection of the resulting SRS signals from the UEs served by the priority operator base station.

At block 503, the priority operator base station monitors for SRS from the one or more served UEs. After communicating the SRS request, the priority operator base station will expect to receive SRS from any of its served UEs that would receive the SRS request. For example, base station 105, under control of controller/processor 240, activates SRS monitor 903, stored in memory 242. The execution environment of SRS monitor 903 allows base station 105 to monitor for SRS from the one or more served UEs.

FIG. 5B is a block diagram illustrating example blocks executed by a non-priority operator to implement one aspect of the present disclosure. The example blocks illustrated in FIG. 5B will also be described with respect to base station 105, as illustrated in FIG. 9. At block 504, a non-priority operator base station observes resource reservation information identifying priority use of shared resources for SRS. For example, the execution environment of base station 105, under control of controller/processor 240, allows base station 105 to observe resource reservation information identifying priority use of shared resources for SRS. When sharing spectrum with a higher-priority operator, the non-priority operator base station observes the resource reservation information from the priority operator either explicitly, through a resource reservation signal sent indirectly via the priority base station SRS request, and obtained via wireless radios 900a-t and antennas 234a-t, or directly received via the resource reservation signal from the priority base station via over-the-air, using the wireless radios 900a-t and antennas 234a-t, or backhaul communications, or implicitly by observing SRS from the priority operator and making the determination of the amount of resources for the priority use based on the receive priority SRS.

At block 505, the non-priority operator base station selects an available amount of SRS resources for SRS of one or more of its served UEs, wherein the available amount of SRS resources is selected from the shared SRS resources remaining after the priority use. After determining the amount of resources reserved by the priority operator, the non-priority operator base station will select the amount of SRS resources for its own served UEs from the remaining resources available for SRS. For example, base station 105, under control of controller/processor 240, activates SRS resource selector 904, stored in memory 242. The execution environment of SRS resource selector 904 allows base station 105 to select an available amount of SRS resources for SRS of one or more of its served UEs, wherein the available amount of SRS resources is selected from the shared SRS resources remaining after the priority use.

At block 506, the non-priority operator base station transmits a non-priority resource reservation signal to each of its one or more served UEs, wherein the non-priority resource reservation signal identifies the available amount of SRS resources selected by the non-priority operator base station. For example, base station 105, under control of controller/processor 240, may activate non-priority resource reservation signal generator 905, stored in memory 242. The execution environment of non-priority resource reservation signal generator 905 allows base station 105 to generate a resource reservation signal, and to transmit the non-priority resource reservation signal to each of its one or more served UEs via wireless radios 900a-t and antennas 234a-t, wherein the non-priority resource reservation signal identifies the available amount of SRS resources selected by the non-priority operator base station. The non-priority operator base station transmits the notification of its SRS resource reservation through the resource reservation signal. This signal may be transmitted in the SRS request of the non-priority operator base station or may be transmitted directly to the priority operator via over-the-air or backhaul communications.

In another example of operation, the preamble of the higher priority operator may indicate three kinds of resource utilization in a resource reservation signal sent in the SRS request preamble: low use, in which approximately one-third of the available SRS resources will be used; medium use, in which approximately one-half of the available SRS resources will be used; and high use, in which the higher priority operator intends to use, or at least reserve for use, all of the available SRS resources. The lower priority base station, on detecting from the high priority operator, the resource reservation signal in the preamble indicating resource utilization of: (1) low use, may respond with its own low or a medium use resource reservation signal in its preamble for estimated SRS resource use but not with a high use signal; (2) medium use, may respond with a low or medium use resource reservation signal in the preamble for estimated SRS resource use but, again, not with a high use signals; or (3) high use, in which the lower priority operator may not transmit at all in this time period. In the presently described example, upon not detecting any resource reservation signal in the preamble from the priority operator base station, the lower priority operator base station may respond by transmitting any of a low, medium, or high use resource reservation signal in its SRS request preamble.

It should be noted that division of SRS resources for purposes of the resource reservation information may include more or fewer than three levels. The low, medium, and high use levels are merely used as an example. The present disclosure is not limited to such three-level division.

FIGS. 6A-6D are block diagrams illustrating dynamic resource allocation of SRS between base stations from two different operators according to one aspect of the present disclosure. In FIG. 6A, Operator 0, which has priority access to the shared spectrum, sends an SRS request in communication stream 404 from base stations 400-401 that includes a resource reservation signal in the preamble identifying a high use reservation for SRS resources. In response to the high use reservation signal, the base stations of Operator 1, base stations 402-403 refrain from transmissions completely.

In FIG. 6B, Operator 0, again with priority access, sends an SRS request in communication stream 404 from base stations 400-401 that includes a resource reservation signal in the preamble the identifies a low use reservation. In response to the low use reservation signal, base stations 402-403 transmit an SRS request in communication stream 405 identifying a medium use reservation of the remaining SRS resources of the transmission opportunity. In reading the low use reservation from Operator 0, base stations 402-403 may respond with either a low or medium use resource reservation signal, depending on the amount of traffic available for Operator 1's UEs. In the illustrated example of FIG. 6B, the amount of traffic for Operator 1's UEs supported a medium use reservation from base stations 402-403.

In FIG. 6C, Operator 0, again with priority access, sends an SRS request in communication stream 404 from base stations 400-401 that includes a resource reservation signal in the preamble the identifies a medium use reservation. In response to the medium use reservation signal, base stations 402-403 transmit an SRS request in communication stream 405 identifying a medium use reservation of the remaining SRS resources of the transmission opportunity. In the illustrated example of FIG. 6C, the amount of traffic for Operator 1's UEs supported a medium use reservation from base stations 402-403.

In FIG. 6D, Operator 0 does not transmit anything. With base stations 402-403 not detecting any transmissions from base stations 400-401 of Operator 0, it is free to select any amount of SRS resources for its SRS scheduling. In communication stream 405, base stations 402-403 transmits a high use reservation within the SRS request. Base stations 402-403 will then begin to monitor for any SRS from its served UEs.

By dynamically indicating the amount of resource utilization in SDM-CoMP, TDM-CoMP can be treated as a special case of SDM-CoMP, where the SRS request preambles are either absent or indicate a high use resource utilization.

Figure 7:
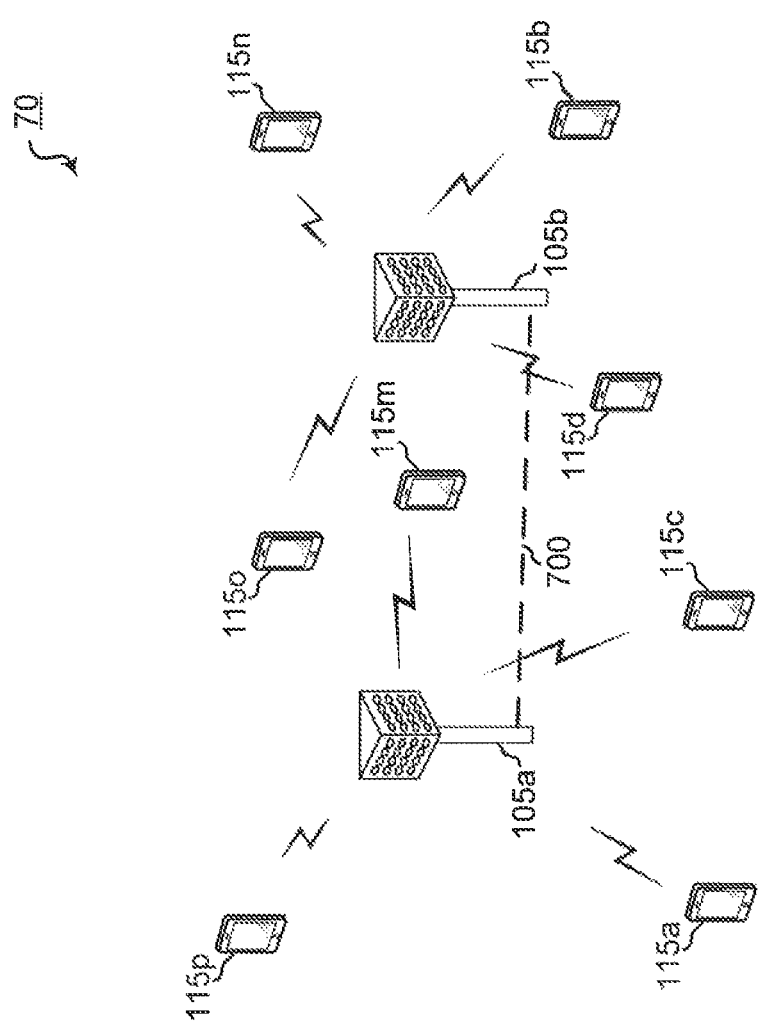
FIG. 7 is a block diagram illustrating a shared spectrum network with base stations configured according to one aspect of the present disclosure.

FIG. 7 is a block diagram illustrating shared spectrum network 70 with base stations 105a and 105b configured according to one aspect of the present disclosure. For purposes of the illustrated example, base station 105a is associated with a first network operator and base station 105b is associated with a second, different network operator. Base station 105a serves UEs 115a, c, m, p, (first operator users) while base station 105b services UEs 115b, d, n, o (second operator users). The users of the second operator (UEs 115b, d, n, o) who are triggered to transmit SRS, may depend on the result of reception of the SRS of the first operator at the second operator. As an example, the second operator may trigger users that are away from the cells of the second operator that receive a very strong SRS from users of the first operator. For instance, base station 105b listens for SRS from any of the UEs of the first network operator. Base station 105b hears SRS from both UEs 115c and 115m. Based on these SRS, base station 105b determines to schedule SRS from UEs 115b and 115n only in order to avoid potential interference to the communications of the first operator between base station 105a and UEs 115c and 115m. The users that the first and second operator schedule for data may depend on the SRS receptions from the other operator, such that base station 105b does not schedule UEs 115d and 115o for communications when it detects strong SRS from UEs 115m and 115c.

The solutions according to the various aspect of the present disclosure provide for reservation of SRS resource usage that may be signaled over-the-air, such as between base stations 105a and 105b (FIG. 7), or this information can be conveyed over backhaul 700 to the other operator. The resource reservation information may also be conveyed over the air but not be explicitly indicated in a preamble to an SRS request. For example, the reservation may inferred by the second operator (base station 105b) by detecting the presence of SRS transmissions of the first operator from any of UEs 115a, 115c, 115m, and 115p. When such SRS transmissions are detected, base station 105b may determine the amount of the shared SRS resources that have priority use from the first operator (base station 105a) and then select an amount of available SRS resources for its scheduling of SRS from any of UEs 115b, 115b, 115n, and 115o.

Figure 8B:
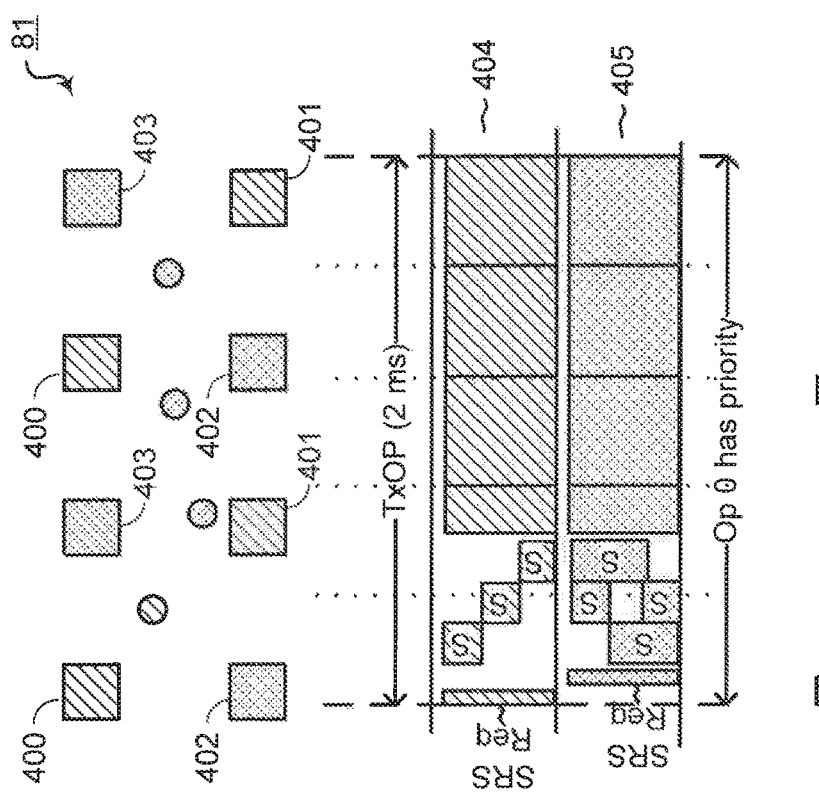
FIGS. 8A and 8B are block diagrams illustrating shared spectrum networks between network nodes configured according to aspects of the present disclosure.
Figure 8A:
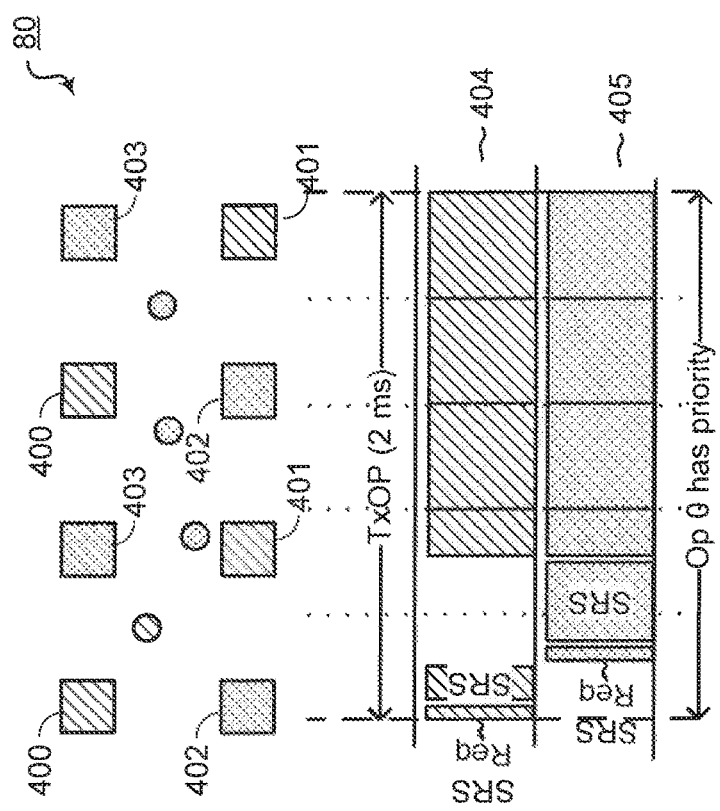

FIGS. 8A and 8B are block diagrams illustrating shared spectrum networks 80 and 81 between network nodes configured according to aspects of the present disclosure. The SRS resources may be partitioned in time or frequency. FIG. 8A illustrates SRS resources that are partitioned in time. Operator 0, which has priority access to share spectrum network 80, communicates via base stations 400-401 over communication stream 404. SRS requests from base stations 400-401 and the responding SRS of the served UEs of Operator 0 occur in resources at a prior time than the SRS requests from base stations 402-403 of Operator 1 over communication stream 405.

FIG. 8B illustrates SRS resources that are partitioned in frequency. The SRS transmitted from UEs of Operator 0 and Operator 1 may be transmitted at the same time, but they are transmitted at different frequencies in communication streams 404 and 405. When partitioned in frequency, the SRS requests for Operator 1 will be sent over communication stream 405 in a transmission gap between the SRS request transmitted over communication stream 404 from Operator 0 and the SRS transmissions from Operator 0 users. The assignment of frequencies may be included in the resource reservation signals from base stations 400 and 401 of Operator 0 or may be assigned via direct over-the-air or backhaul signals between the base stations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A and 5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a priority base station associated with a first network operator, an estimated fractional amount of total sounding reference signal (SRS) resources for SRS of one or more served user equipments (UEs), wherein the priority base station uses shared communication spectrum shared with one or more non-priority base stations associated with at least one different network operator, wherein the one or more priority base stations have priority access to the shared communication spectrum over the non-priority base station;
   transmitting, by the priority base station, an SRS request signal to each of the one or more served UEs;
   conveying, by the priority base station, resource reservation information identifying the estimated fractional amount of total SRS resources determined; and
   monitoring, by the priority base station, for SRS from the one or more served UEs.

2. A method of wireless communication, comprising:
   determining, at a priority base station associated with a first network operator, an estimated amount of sounding reference signal (SRS) resources for SRS of one or more served user equipments (UEs), wherein the priority base station uses shared communication spectrum shared with one or more non-priority base stations associated with at least one different network operator, wherein the one or more priority base stations have priority access to the shared communication spectrum over the non-priority base station;
   transmitting, by the priority base station, an SRS request signal to each of the one or more served UEs;
   conveying, by the priority base station, resource reservation information identifying the estimated amount of SRS resources determined;
   monitoring, by the priority base station, for SRS from the one or more served UEs;
   detecting, by the priority base station, one or more non-priority SRS from one or more non-priority UEs associated with the at least one different network operator; and
   scheduling, by the priority base station, communications with the one or more served UEs based on the detected one or more non-priority SRS.

3. The method of claim 1, wherein the resource reservation information is a resource reservation signal included within the SRS request.

4. The method of claim 1, wherein the conveying includes:
   transmitting the resource reservation information in a resource reservation signal via one of:
      an over-the-air transmission; or
      a backhaul connection.

5. The method of claim 1, wherein the monitoring includes:
   monitoring for the SRS from the one or more served UEs on resources partitioned in one of:
      time, or
      frequency;
   with non-priority SRS resources used by one or more non-priority UEs associated with the one or more non-priority base stations.

6. A method of wireless communication, comprising:
   determining, at a priority base station associated with a first network operator, an estimated amount of sounding reference signal (SRS) resources for SRS of one or more served user equipments (UEs), wherein the priority base station uses shared communication spectrum shared with one or more non-priority base stations associated with at least one different network operator, wherein the one or more priority base stations have priority access to the shared communication spectrum over the non-priority base station;
   transmitting, by the priority base station, an SRS request signal to each of the one or more served UEs;
   conveying, by the priority base station, resource reservation information identifying the estimated amount of SRS resources determined;
   monitoring, by the priority base station, for SRS from the one or more served UEs on resources partitioned in frequency with non-priority SRS resources used by one or more non-priority UEs associated with the one or more non-priority base stations; and
   scheduling a transmission gap for the one or more served UEs after the SRS request for zero or more non-priority SRS requests from the one or more non-priority base stations.

7. A method of wireless communication, comprising:
   observing, by a non-priority base station associated with a first network operator, resource reservation information identifying priority use of shared resources for sounding reference signals (SRS), wherein the non-priority base station uses shared communication spectrum shared with one or more priority base stations associated with at least one different network operator, wherein the one or more priority base stations have priority access to the shared communication spectrum over the non-priority base station;
   selecting, by the non-priority base station, an available amount of SRS resources for SRS of one or more served user equipments (UEs), wherein the available amount of SRS resources is selected from the shared resources for SRS remaining after the priority use; and
   transmitting, by the non-priority base station, a non-priority resource reservation signal to each of the one or more served UEs, wherein the non-priority resource reservation signal identifies the available amount of SRS resources.

8. The method of claim 7, further including:
   detecting, by the non-priority base station, one or more priority SRS from one or more priority UEs associated with the at least one different network operator; and
   scheduling, by the non-priority base station, communications with the one or more served UEs based on the detected one or more priority SRS.

9. The method of claim 7, wherein the resource reservation information is a priority resource reservation signal included within a priority SRS request detected by the non-priority base station from the one or more priority base stations.

10. The method of claim 7, wherein the observing includes:

receiving the resource reservation information in a resource reservation signal from the one or more priority base stations via one of:
an over-the-air transmission; or
a backhaul connection.

11. The method of claim 7, wherein the observing includes:
detecting, by the non-priority base station, one or more priority SRS from one or more priority UEs associated with the at least one different network operator; and
determining, by the non-priority base station, the priority use of the shared resources for SRS based on the detected one or more priority SRS.

12. The method of claim 7, further including:
monitoring for SRS from the one or more served UEs on resources partitioned in one of:
time, or
frequency;
with priority SRS resources used by one or more priority UEs associated with the one or more priority base stations.

13. The method of claim 12,
wherein the resources are partitioned in frequency, and
wherein the transmitting the non-priority resource reservation signal occurs in a transmission gap immediately after a priority SRS request transmitted by the one or more priority base stations.

14. An apparatus configured for wireless communication, the apparatus comprising:
at least one processor; and
a memory coupled to the at least one processor,
wherein the at least one processor is configured:
to determine, at a priority base station associated with a first network operator, an estimated fractional amount of total sounding reference signal (SRS) resources for SRS of one or more served user equipments (UEs), wherein the priority base station uses shared communication spectrum shared with one or more non-priority base stations associated with at least one different network operator, wherein the one or more priority base stations have priority access to the shared communication spectrum over the non-priority base station;
to transmit, by the priority base station, an SRS request signal to each of the one or more served UEs;
to convey, by the priority base station, resource reservation information identifying the estimated fractional amount of total SRS resources determined; and
to monitor, by the priority base station, for SRS from the one or more served UEs.

15. An apparatus configured for wireless communication, the apparatus comprising:
at least one processor; and
a memory coupled to the at least one processor,
wherein the at least one processor is configured:
to determine, at a priority base station associated with a first network operator, an estimated amount of sounding reference signal (SRS) resources for SRS of one or more served user equipments (UEs), wherein the priority base station uses shared communication spectrum shared with one or more non-priority base stations associated with at least one different network operator, wherein the one or more priority base stations have priority access to the shared communication spectrum over the non-priority base station;
to transmit, by the priority base station, an SRS request signal to each of the one or more served UEs;
to convey, by the priority base station, resource reservation information identifying the estimated amount of SRS resources determined; and
to monitor, by the priority base station, for SRS from the one or more served UEs;
to detect, by the priority base station, one or more non-priority SRS from one or more non-priority UEs associated with the at least one different network operator; and
to schedule, by the priority base station, communications with the one or more served UEs based on the detected one or more non-priority SRS.

16. The apparatus of claim 14, wherein the resource reservation information is a resource reservation signal included within the SRS request.

17. The apparatus of claim 14, wherein configuration of the at least one processor to convey includes configuration to transmit the resource reservation information in a resource reservation signal via one of:
an over-the-air transmission; or
a backhaul connection.

18. The apparatus of claim 14, wherein the configuration of the at least one processor to monitor includes configuration to monitor for the SRS from the one or more served UEs on resources partitioned in one of:
time, or
frequency;
with non-priority SRS resources used by one or more non-priority UEs associated with the one or more non-priority base stations.

19. An apparatus configured for wireless communication, the apparatus comprising:
at least one processor; and
a memory coupled to the at least one processor,
wherein the at least one processor is configured:
to determine, at a priority base station associated with a first network operator, an estimated amount of sounding reference signal (SRS) resources for SRS of one or more served user equipments (UEs), wherein the priority base station uses shared communication spectrum shared with one or more non-priority base stations associated with at least one different network operator, wherein the one or more priority base stations have priority access to the shared communication spectrum over the non-priority base station;
to transmit, by the priority base station, an SRS request signal to each of the one or more served UEs;
to convey, by the priority base station, resource reservation information identifying the estimated amount of SRS resources determined; and
to monitor, by the priority base station, for SRS from the one or more served UEs on resources partitioned in frequency with non-priority SRS resources used by one or more non-priority UEs associated with the one or more non-priority base stations; and
to schedule a transmission gap for the one or more served UEs after the SRS request for zero or more non-priority SRS requests from the one or more non-priority base stations.

20. An apparatus configured for wireless communication, the apparatus comprising:

at least one processor; and a memory coupled to the at least one processor, wherein the at least one processor is configured:

to observe, by a non-priority base station associated with a first network operator, resource reservation information identifying priority use of shared resources for sounding reference signals (SRS), wherein the non-priority base station uses shared communication spectrum shared with one or more priority base stations associated with at least one different network operator, wherein the one or more priority base stations have priority access to the shared communication spectrum over the non-priority base station;

to select, by the non-priority base station, an available amount of SRS resources for SRS of one or more served user equipments (UEs), wherein the available amount of SRS resources is selected from the shared resources for SRS remaining after the priority use; and to transmit, by the non-priority base station, a non-priority resource reservation signal to each of the one or more served UEs, wherein the non-priority resource reservation signal identifies the available amount of SRS resources.

21. The apparatus of claim 20, further including configuration of the at least one processor:

to detect, by the non-priority base station, one or more priority SRS from one or more priority UEs associated with the at least one different network operator; and to schedule, by the non-priority base station, communications with the one or more served UEs based on the detected one or more priority SRS.

22. The apparatus of claim 20, wherein the resource reservation information is a priority resource reservation signal included within a priority SRS request detected by the non-priority base station from the one or more priority base stations.

23. The apparatus of claim 20, wherein the configuration of the at least one processor to observe includes configuration to receive the resource reservation information in a resource reservation signal from the one or more priority base stations via one of:

an over-the-air transmission; or a backhaul connection.

24. The apparatus of claim 20, wherein the configuration of the at least one processor to observe includes configuration of the at least one processor:

to detect, by the non-priority base station, one or more priority SRS from one or more priority UEs associated with the at least one different network operator; and to determine, by the non-priority base station, the priority use of the shared resources for SRS based on the detected one or more priority SRS.

25. The apparatus of claim 20, further including configuration of the at least one processor to monitor for SRS from the one or more served UEs on resources partitioned in one of:

time, or frequency;

with priority SRS resources used by one or more priority UEs associated with the one or more priority base stations.

26. The apparatus of claim 25, wherein the resources are partitioned in frequency, and wherein the configuration of the at least one processor to transmit the non-priority resource reservation signal is executed to occur in a transmission gap immediately after a priority SRS request transmitted by the one or more priority base stations.

* * * * *